US011660839B2

(12) United States Patent
Luan et al.

(10) Patent No.: US 11,660,839 B2
(45) Date of Patent: May 30, 2023

(54) THREE-DIMENSIONAL HIERARCHICAL LAYERED POROUS COPPER AND METHOD FOR MAKING THE SAME

(71) Applicants: Tsinghua University, Beijing (CN); HON HAI PRECISION INDUSTRY CO., LTD., New Taipei (TW)

(72) Inventors: Chen Luan, Beijing (CN); Lu Chen, Beijing (CN); Bin Li, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/344,115

(22) Filed: Jun. 10, 2021

(65) Prior Publication Data
US 2022/0250352 A1 Aug. 11, 2022

(30) Foreign Application Priority Data
Feb. 5, 2021 (CN) .......................... 202110164566.8

(51) Int. Cl.
*B32B 15/01* (2006.01)
*C22F 1/08* (2006.01)
(Continued)

(52) U.S. Cl.
CPC ................ *B32B 15/01* (2013.01); *B21B 3/00* (2013.01); *C22C 3/005* (2013.01); *C22F 1/08* (2013.01);
(Continued)

(58) Field of Classification Search
CPC ..... B21B 2003/005; B21B 3/00; B32B 15/01; C22C 3/005; C22F 1/08; C22F 1/165; C25F 3/02; H01G 11/68
See application file for complete search history.

(56) References Cited

U.S. PATENT DOCUMENTS 7,799,437 B2 * 9/2010 Chan .................... B23K 35/284
106/286.2
9,518,335 B2 * 12/2016 Zhang ....................... C25F 3/14
(Continued)

FOREIGN PATENT DOCUMENTS

| CN | 101956090 | 1/2012 |
|---|---|---|
| CN | 105018776 | 9/2017 |

(Continued)

OTHER PUBLICATIONS

CN-109988932-A, Machine translation. (Year: 2022).*
(Continued)

*Primary Examiner* — Christopher Remavege
(74) *Attorney, Agent, or Firm* — ScienBiziP, P.C.

(57) ABSTRACT

A method for making a three-dimensional hierarchical layered porous copper, the method includes providing a copper-zinc alloy precursor being composed of a β' phase and a γ phase, and treating the copper-zinc alloy precursor by electrochemical dealloying. The present application further provides a three-dimensional hierarchical layered porous copper including a first surface layer, an intermediate layer, and a second surface layer stacked in that order. The first surface layer includes a plurality of micron-scale pores and a plurality of first nanoscale pores. The intermediate layer includes a plurality of second nanoscale pores. The second surface layer includes the plurality of micron-scale pores and the plurality of first nanoscale pores.

11 Claims, 6 Drawing Sheets

(51) Int. Cl.
  *C22F 1/16* (2006.01)
  *B21B 3/00* (2006.01)
  *C22C 3/00* (2006.01)
  *C25F 3/02* (2006.01)
  *H01G 11/68* (2013.01)

(52) U.S. Cl.
  CPC ............... *C22F 1/165* (2013.01); *C25F 3/02* (2013.01); *B21B 2003/005* (2013.01); *H01G 11/68* (2013.01)

(56) References Cited

U.S. PATENT DOCUMENTS

| | | | |
|---|---|---|---|
| 10,844,508 | B2 | 11/2020 | Meng et al. |
| 2015/0360952 | A1* | 12/2015 | Fan ................. C01B 32/205 216/13 |
| 2020/0248323 | A1* | 8/2020 | Bishwas ............... C25B 11/057 |
| 2021/0402497 | A1* | 12/2021 | Ly ............... C22F 1/08 |
| 2022/0074024 | A1* | 3/2022 | Smith ................. C22C 9/00 |

FOREIGN PATENT DOCUMENTS

| | | | |
|---|---|---|---|
| CN | 108149048 | | 6/2018 |
| CN | 108188400 | | 6/2018 |
| CN | 109988932 | | 7/2019 |
| CN | 109988932 A | * 7/2019 | ............. B82Y 40/00 |

OTHER PUBLICATIONS

Zhao, "Compact 3D Copper with Uniform Porous Structure", 2018, Advanced Energy Materials. (Year: 2018).*

Tuan, "Synthesis of nanoporous Cu films by dealloying of electrochemically deposited Cu—Zn alloy films", 2014, Corrosion Science 80 (2014), 7-11. (Year: 2014).*

* cited by examiner

FIG. 11

THREE-DIMENSIONAL HIERARCHICAL LAYERED POROUS COPPER AND METHOD FOR MAKING THE SAME

FIELD

The present application relates to the field of metal material, in particular to a porous copper material and a method for making the porous copper material.

BACKGROUND

Porous metals are widely used in the fields of catalysis, heat exchangers, energy storage, biosensors, and surface-enhanced Raman scattering due to their ultra-high specific surface area and many unique physical and chemical properties. At present, the methods for making the porous metal mainly include: sintering method, 3D printing method, self-assembly method, template method, and dealloying method. However, the porous copper prepared by the existing methods often has defects, such as low porosity and low specific surface area. Therefore, how to improve the porosity and specific surface area of porous copper is a problem that needs to be solved urgently.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to be considered as limiting the scope of the embodiments described herein.

The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 1:
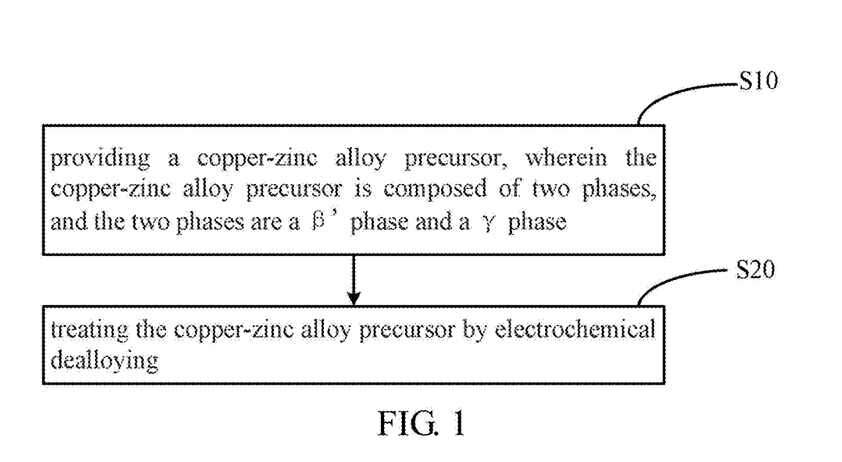
FIG. 1 shows a flowchart of an embodiment of a method for making a three-dimensional hierarchical layered porous copper.

Referring to FIG. 1, a method for making a three-dimensional hierarchical layered porous copper of an embodiment is provided. The three-dimensional hierarchical layered porous copper means that the surface of the porous copper has a micro-nano hierarchical, and the inside of the three-dimensional hierarchical layered porous copper has a plurality of nanoscale ligament and a plurality of nanoscale porous formed by the nano-scale ligament. The term "layered" of three-dimensional hierarchical layered porous copper means that the surface and the inside of the three-dimensional hierarchical layered porous copper have different structural forms. The three-dimensional hierarchical layered porous copper can be divided into surface layer and intermediate layer in space according to the different structural forms. The term "hierarchical" of three-dimensional hierarchical layered porous copper means that the surface layer has two different sizes of pores at the micron and nanoscale, so that the surface layer of the three-dimensional hierarchical layered porous copper has a plurality of micron-scale pores and a plurality of nanoscale pores. The inside of the three-dimensional hierarchical layered porous copper has a plurality of nanoscale pores. The size of the micron-sized pore is micron scale, and the size of the nanoscale pore is nanoscale.

Referring to FIG. 1, a method for making the three-dimensional hierarchical layered porous copper includes the following steps:

S10, providing a copper-zinc alloy precursor, wherein the copper-zinc alloy precursor is composed of two phases, and the two phases are a β' phase and a γ phase; and S20, treating the copper-zinc alloy precursor by electrochemical dealloying.

During step S10, the copper-zinc alloy precursor is composed of the β' phase and the γ phase. The copper-zinc alloy precursor can be prepared by the cumulative rolling method. The basic operation of the cumulative rolling method is: aligning and overlapping a clean copper layer and a clean zinc layer, wherein the size of the copper layer is substantially equal to the size of the zinc layer, but the thickness of the copper layer is different from the thickness of the zinc layer; then folding the overlapped copper layer and zinc layer in half and rolling; and repeating the above-mentioned "folding-rolling" process, until the copper atoms and zinc atoms are substantially evenly distributed. The "folding-rolling" represents a process in which the composite formed by stacking the copper layer and the zinc layer is folded first, and then the folded composite is rolled. This process represents a "folding-rolling" process. In one embodiment, the composite is folded in half to double the original thickness, and then the folded composite is rolled to restore the original thickness. Furthermore, after completing a "folding-rolling" cycle, the formed composite structure can be trimmed to cut off the micro-cracks at the edge position, which prevents the composite structure formed in the subsequent rolling from breaking, and prevents the composite structure formed in the subsequent rolling from affecting the final formation and the performance of porous copper.

In the copper-zinc alloy precursor, copper atoms and zinc atoms are substantially evenly distributed. It should be noted that although the multiple cumulative rolling cycles used in one embodiment can make the copper atoms and zinc atoms distributed very uniformly, because the copper atoms and zinc atoms in the copper-zinc alloy precursor are both microscopic particles, it is limited by the experimental conditions or experimental environment, the copper atoms and zinc atoms in the copper-zinc alloy precursor cannot be guaranteed to be absolutely uniformly distributed.

Figure 2A:
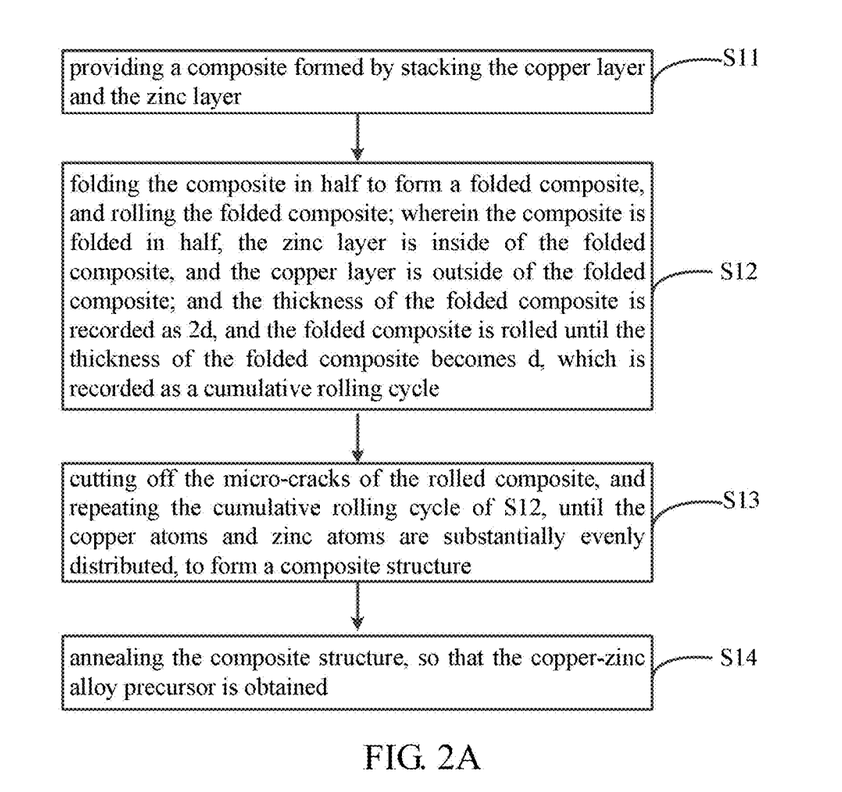
FIG. 2A shows a flowchart of an embodiment of a method for making a copper-zinc alloy precursor.

Referring to FIG. 2A, in one embodiment, the method for making the copper-zinc alloy precursor includes the following steps:

S11, providing a composite formed by stacking the copper layer and the zinc layer;

S12, folding the composite in half to form a folded composite, and rolling the folded composite; wherein the composite is folded in half, the zinc layer is inside of the folded composite, and the copper layer is outside of the folded composite; and the thickness of the folded composite is recorded as 2d, and the folded composite is rolled until the thickness of the folded composite becomes d, which is recorded as a cumulative rolling cycle;

S13, cutting off the micro-cracks of the rolled composite, and repeating the cumulative rolling cycle of S12, until the copper atoms and zinc atoms are substantially evenly distributed, to form a composite structure; and S14, annealing the composite structure, so that the copper-zinc alloy precursor is obtained.

During step S11, the copper layer and the zinc layer can be purchased commercially, or can be prepared by methods such as chemical deposition or electrodeposition. Further, the copper layer and the zinc layer are cleaned before stacking the copper layer and the zinc layer to remove the impurities. The copper layer and zinc layer can be ultrasonically cleaned with acetone and absolute ethanol in sequence, and then air-dried naturally.

Figure 2B:
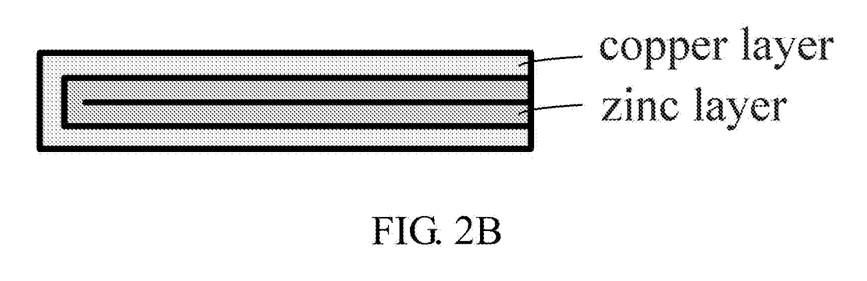
FIG. 2B shows a schematic view of an embodiment of a folded structure formed by folding a composite.

During step S12, folding the composite in half is shown in FIG. 2B.

During step S13, the number of cumulative rolling cycles directly determines the thickness of the single copper metal layer and the single zinc metal layer. The more cumulative rolling cycles, the more even the copper layer and zinc layer are distributed, and the better diffusion and solid solution can be achieved in the subsequent annealing process. The number of the cumulative rolling cycles in one embodiment is 9 times to 12 times.

During step S14, the annealing treatment can make solid solution and diffuse of copper and zinc better. If the annealing temperature is too low, the diffusion of metal atoms (copper atoms and zinc atoms) will be slower; if the annealing temperature is too high, zinc with a lower melting point will melt. Thus, the annealing temperature in one embodiment is in a range from 250 degrees Celsius to 300 degrees Celsius. In one embodiment, the copper-zinc alloy precursor composed of copper and zinc can be obtained after annealing, the copper-zinc alloy precursor only contains β' phase and γ phase, and the atomic ratio of zinc is in a range from 55% to 60%.

The atomic percentage of zinc in the copper-zinc alloy precursor will affect the structure and performance of the three-dimensional hierarchical layered porous copper. The copper-zinc alloy precursor can be composed of β' phase and γ phase by controlling the atomic percentage of zinc atoms in the copper-zinc alloy precursor. In one embodiment, the atomic percentage of zinc in the copper-zinc alloy precursor is in a range from 55% to 60%. At this time, the copper-zinc alloy precursor is composed of β' phase and γ phase, and the unique three-dimensional hierarchical layered porous copper can be obtained after treating the copper-zinc alloy precursor by dealloying. In one embodiment, the surface layer of the three-dimensional hierarchical layered porous copper is a micro-nano hierarchical porous structure, and the intermediate layer of the three-dimensional hierarchical layered porous copper has a nanoscale ligament and a nanoscale porous structure. If the atomic percentage of zinc in the copper-zinc alloy precursor is greater than 60%, the obtained copper-zinc alloy precursor only has γ phase; after dealloying, only a porous structure with a single pore size can be obtained, and the copper-zinc alloy precursor is extremely brittle, which has lost the research significance. If the atomic percentage of zinc in the copper-zinc alloy precursor is less than 55%, after dealloying, generally a micron-sized porous structure with a larger pore size will be obtained.

Further, after the step S10 and before the step S20, the copper-zinc alloy precursor can be washed with ultrapure water and absolute ethanol in sequence, and dried naturally to remove surface impurities. The copper-zinc alloy precursor can also be tailored to a specific size according to specific application scenarios.

During step S20, electrochemical dealloying will remove zinc from the copper-zinc alloy precursor. The electrolyte required for electrochemical dealloying can be a mixed solution of hydrochloric acid and sodium chloride, the reference electrode can be a saturated calomel electrode, the counter electrode can be a metal platinum sheet, and the working electrode can be the above-mentioned cleaned copper-zinc alloy precursor body. In one embodiment, the copper-zinc alloy precursor is used as the working electrode to be potentiostatic polarized in the above-mentioned prepared electrolyte until the current density is very small and gradually approaches zero. The potential range of potentiostatic polarization can be in a range from −0.2 V (volt) to 0.2 V. The electrochemical dealloying time is determined by the thickness of the copper-zinc alloy precursor. The greater the thickness of the copper-zinc alloy precursor, the longer the electrochemical dealloying time.

The three-dimensional hierarchical layered porous copper obtained by the present invention has a micro-nano hierarchical porous structure on the surface layer, and micron-scale pores and nanoscale pores are distributed on the surface layer. The size of the micron-scale pore is in a range from about 1 micron to about 3 microns. The size of the nanoscale pore is about tens of nanometers, such as 15 nanometers to 85 nanometers. In one embodiment, the size of the micron-scale pore in the surface layer is in a range from 1 micron to 3 microns, and the size of the nanoscale pore in the surface layer is in a range from 15 nanometers to 85 nanometers. The three-dimensional hierarchical layered porous copper has nanoscale pores on the intermediate layer. The ligaments of the intermediate layer are about tens of nanometers, the nanoscale pore of the intermediate layer is formed by the interlacing of the ligaments in the intermediate layer, and the size of the nanoscale pore in the intermediate layer is about a few hundred nanometers.

The following examples and comparative examples of the three-dimensional hierarchical layered porous copper are further described in detail.

Example 1

Metal copper and metal zinc were sequentially electroplated on a thin metal titanium plate to form a composite electroplating layer including a metal copper layer and a metal zinc layer. The electrolyte used for electroplating metallic copper is composed of copper sulfate pentahydrate, concentrated sulfuric acid, and glucose; the anode is a phosphor copper plate, the cathode is a titanium plate, and the current density is 0.03 A/cm$^2$. The electrolyte used for electroplating metal zinc is composed of zinc sulfate heptahydrate, ammonium sulfate, and sodium lauryl sulfate; the anode is a zinc plate, the cathode is a titanium plate plated with metal copper, and the current density is 0.01 A/cm$^2$. By adjusting the time of copper plating and zinc plating, the atomic percentage of zinc in the composite electroplating layer is controlled within the range of 55% to 60%.

After electroplating metal copper and before electroplating metal zinc, the ultra-pure water can be used to wash the surface of the titanium plate plated with metal copper to clean off the previous electrolyte. After washing, it can be wiped with alcohol cotton and dried with a nitrogen gun.

Figure 3:
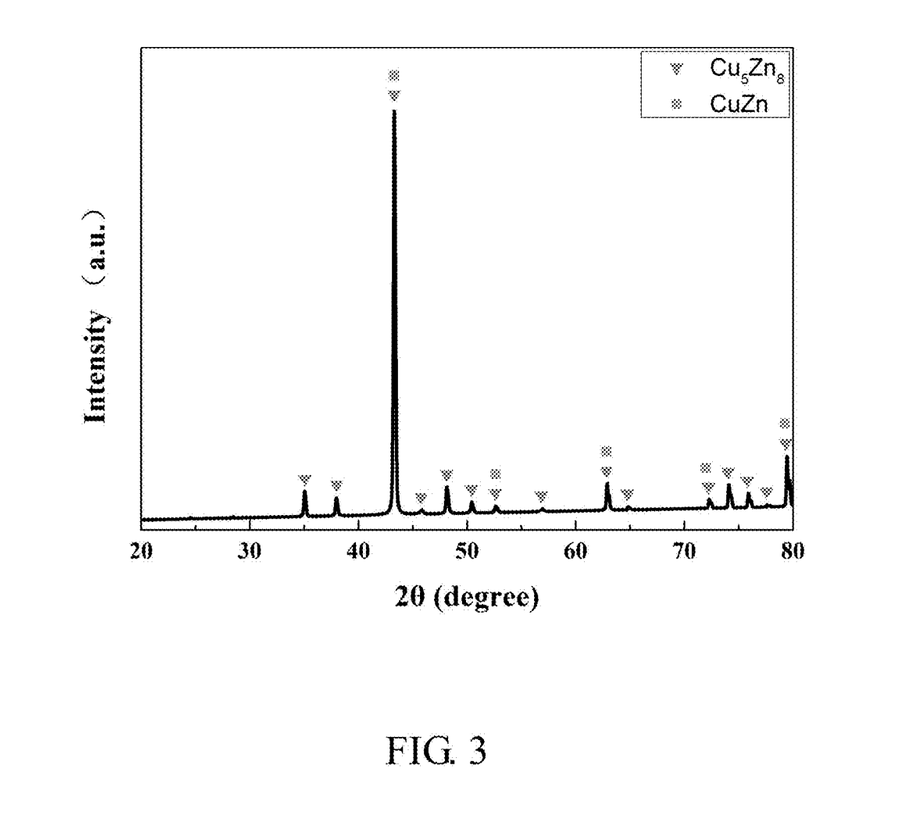
FIG. 3 shows an X-ray diffraction (XRD) diffraction pattern of a copper-zinc alloy precursor in an example 1.

The composite electroplating layer containing the metal copper layer and the metal zinc layer is gently peeled off the titanium plate, thereby obtaining a metal composite. The metal composite can be cut to the appropriate size as required. The metal is folded in half and then cumulative rolled. It is defined that when the thickness of the metal composite is half of the initial thickness, it is a cumulative rolling cycle, and all cracks should be cut after each cumulative rolling cycle. The cutting off the micro-cracks on the trimming edge can prevent the cracks from growing during the subsequent rolling process, and the crack growing can result in serious material fragmentation. The number of the cumulative rolling cycles is 9, and a total of 9 cumulative rolling cycles make the distribution of copper and zinc more uniform and facilitate thermal diffusion. Then it is annealed at 300 degrees Celsius for 24 hours, so that the alloy is fully diffused and solid solution. It can be obtained from the XRD diffraction pattern of FIG. 3 that the copper-zinc alloy precursor obtained by the method of the example 1 is composed of $Cu_5Zn_8$ phase and CuZn phase, and the copper-zinc alloy precursor obtained by the method of the example 1 is composed of the β' phase and the γ phase.

The electrochemical dealloying is performed on the copper-zinc alloy precursor. The copper-zinc alloy precursor is washed with the ultrapure water and the absolute ethanol in sequence to remove impurities on the surface of the copper-zinc alloy precursor. After drying naturally, the copper-zinc alloy precursor is cut into a suitable size as a working electrode for later use. A mixed solution of hydrochloric acid and sodium chloride is configured as an electrolyte, and an appropriate amount of the electrolyte is placed in an electrolytic cell of a three-electrode device, the reference electrode is a saturated calomel electrode, and the counter electrode is a metal platinum sheet.

The reference electrode, the counter electrode, and the working electrode are respectively connected with the white wire, the red wire, and the green wire of the three-electrode device. Let the three-electrode device stand for a period of time until the open circuit potential is stable, and then the potentiostatic polarization is performed at 0 volt until the current density is very small, to obtain the three-dimensional hierarchical layered porous copper.

Figure 4:
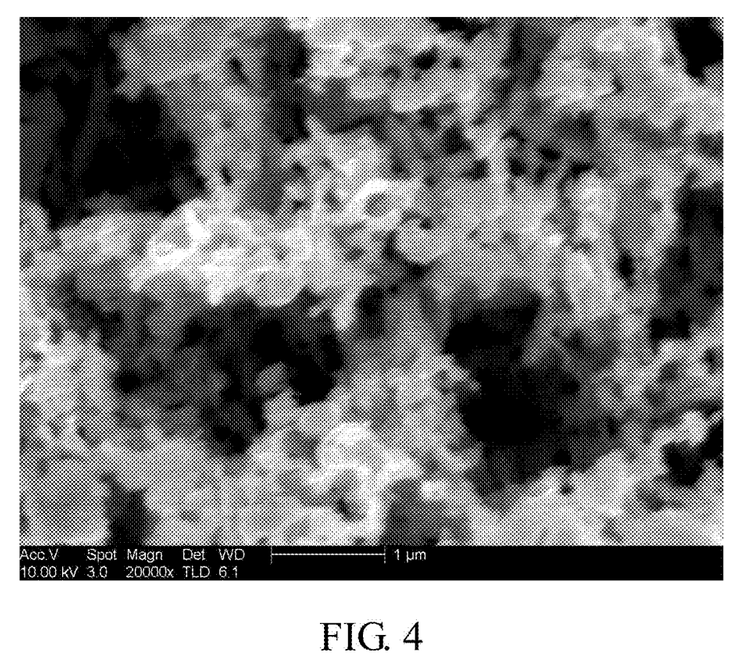
FIG. 4 shows a scanning electron microscope (SEM) image of a surface layer of the three-dimensional hierarchical layered porous copper obtained in the example 1.
Figure 5:
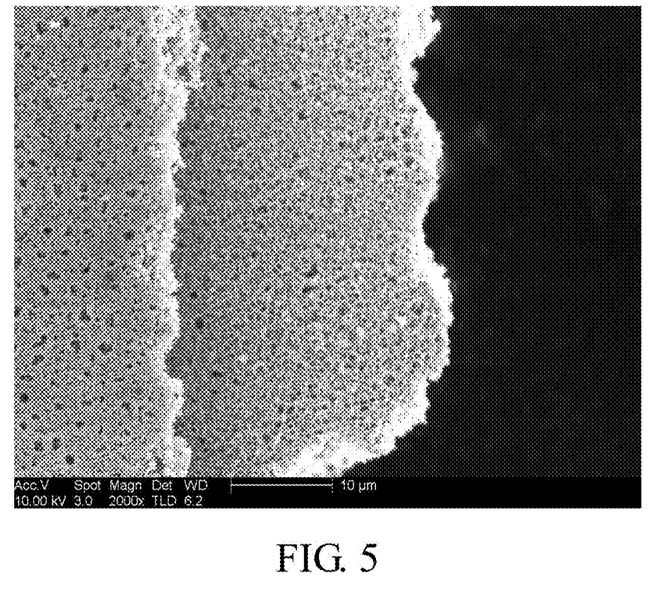
FIG. 5 shows an SEM image of a cut edge of the three-dimensional hierarchical layered porous copper obtained in the example 1.
Figure 6:
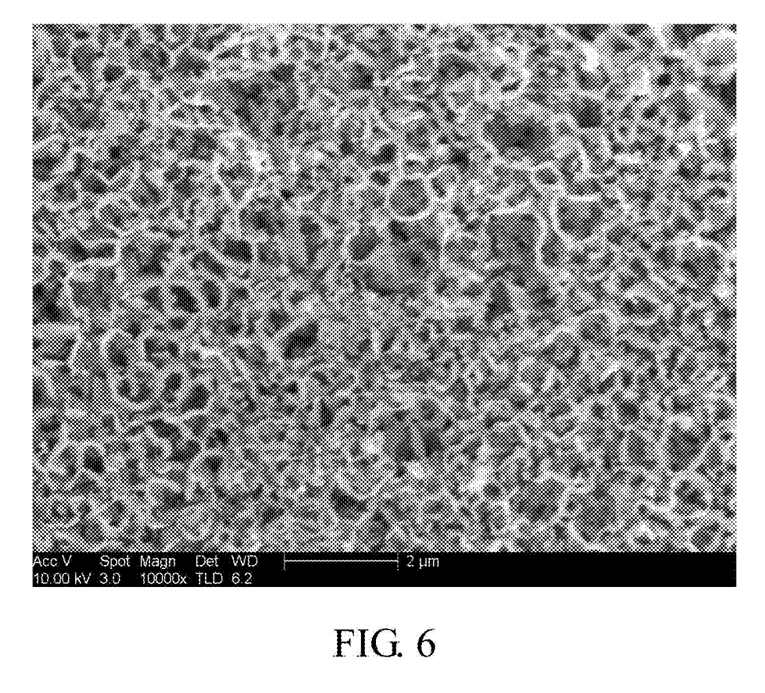
FIG. 6 shows an SEM image of an intermediate layer of the three-dimensional hierarchical layered porous copper obtained in the example 1.
Figure 7:
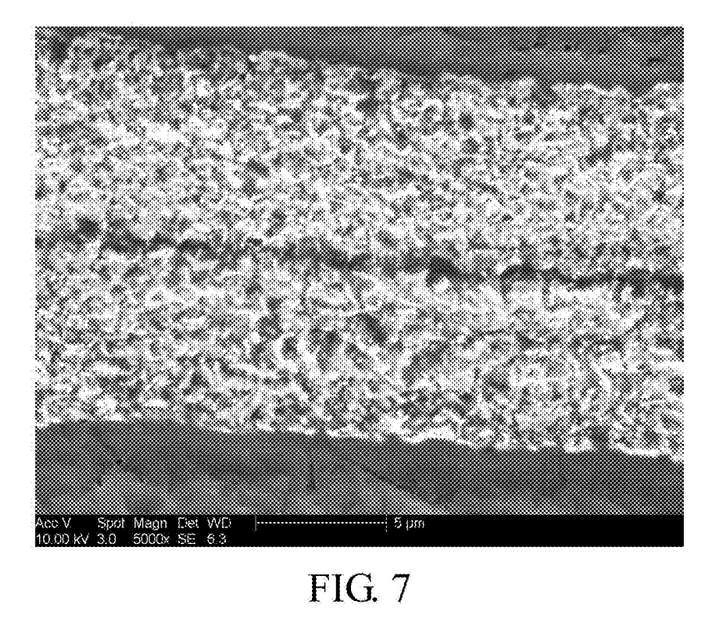
FIG. 7 shows an SEM image of a cross-section of the three-dimensional hierarchical layered porous copper obtained in the example 1.

FIG. 4 shows a scanning electron microscope (SEM) image of the surface layer of the three-dimensional hierarchical layered porous copper of the example 1. Seen from FIG. 4, the surface layer has a micro-nano hierarchical porous structure with micron-scale pore about 1 micron to 2 micrometers, and nanoscale pore about tens of nanometers. FIG. 5 shows an SEM image of a cut edge of the three-dimensional hierarchical layered porous copper of the example 1. From the FIG. 5, it can be seen that the three-dimensional hierarchical layered porous copper is layered and the surface layer and the intermediate layer are different in porous structure. FIG. 6 shows an SEM image of the intermediate layer of the three-dimensional hierarchical layered porous copper of the example 1. From the FIG. 6, it can be seen that the intermediate layer is a nanoscale pore structure with ligaments of tens of nanometers and nanoscale pores of hundreds of nanometers. Seen from the cross-sectional view of the three-dimensional hierarchical layered porous copper in FIG. 7, there are two layers, some parts of the layers are separated, some parts are tightly connected, and the corrosion is very complete. Thus, seen from FIG. 7, the three-dimensional hierarchical layered porous copper is layered structure.

Example 2

Using the same method as in the example 1, metal copper was electroplated on a thin metal titanium plate to form a metal copper layer. Then the surface of the titanium plate coated with copper is washed by the ultrapure water to clean off the previous electrolyte. After washing, it can be wiped with alcohol cotton and dried with a nitrogen gun.

The metal copper layer obtained by electroplating is gently peeled off the titanium plate to obtain a copper foil. The copper foil and a commercially purchased zinc foil are cut into the same size. The copper foil clamps the zinc foil and be folded in half, and then cumulative rolled, which is consistent with the cumulative rolling operation in the example 1. The number of the cumulative rolling cycles is 9, and a total of 9 cumulative rolling cycles make the distribution of copper and zinc more uniform and facilitate thermal diffusion. Then it is annealed at 300 degrees Celsius for 24 hours, so that the alloy is fully diffused and solid solution. By adjusting the copper plating time, the atomic percentage of zinc in the copper-zinc alloy is controlled within the range of 55% to 60%. Then, the same electrochemical dealloying conditions and parameters as in the example 1 are used to finally obtain three-dimensional hierarchical layered porous copper.

Figure 8:
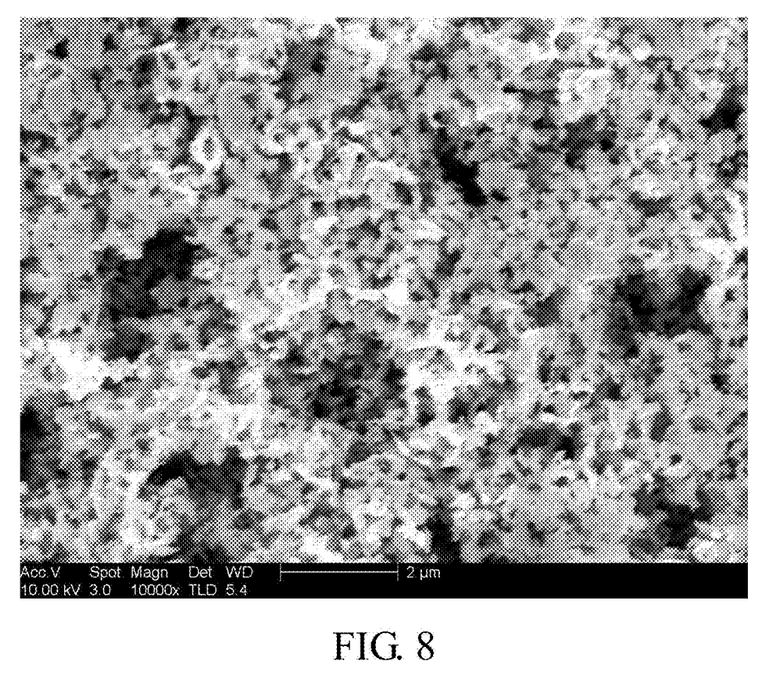
FIG. 8 shows an SEM image of a surface layer of the three-dimensional hierarchical layered porous copper obtained in an example 2.
Figure 9:
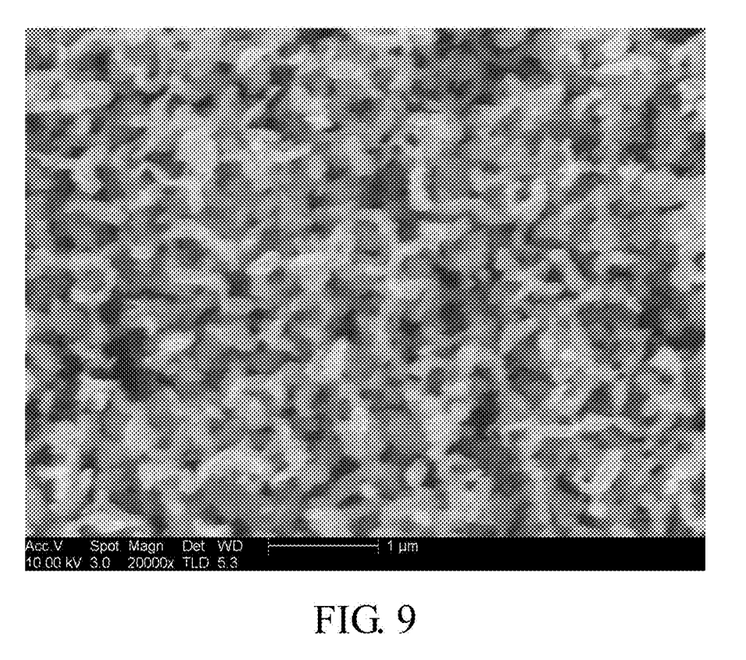
FIG. 9 shows an SEM image of an intermediate layer of the three-dimensional hierarchical layered porous copper obtained in the example 2.

Referring to FIGS. 8 and 9, the three-dimensional hierarchical layered porous copper of the example 2 has a micro-nano hierarchical porous structure on the surface layer, and micron-scale pores and nanoscale pores are distributed on the surface layer; and the size of the micron-scale pore is 1 micron, and the size of the nanoscale pore is about tens of nanometers. The three-dimensional hierarchical layered porous copper of example 2 has nanoscale pores on the intermediate layer, the ligaments are about tens of nanometers, and the size of the nanoscale pore in the intermediate layer is about a few hundred nanometers.

Comparative Example 1

Figure 10:
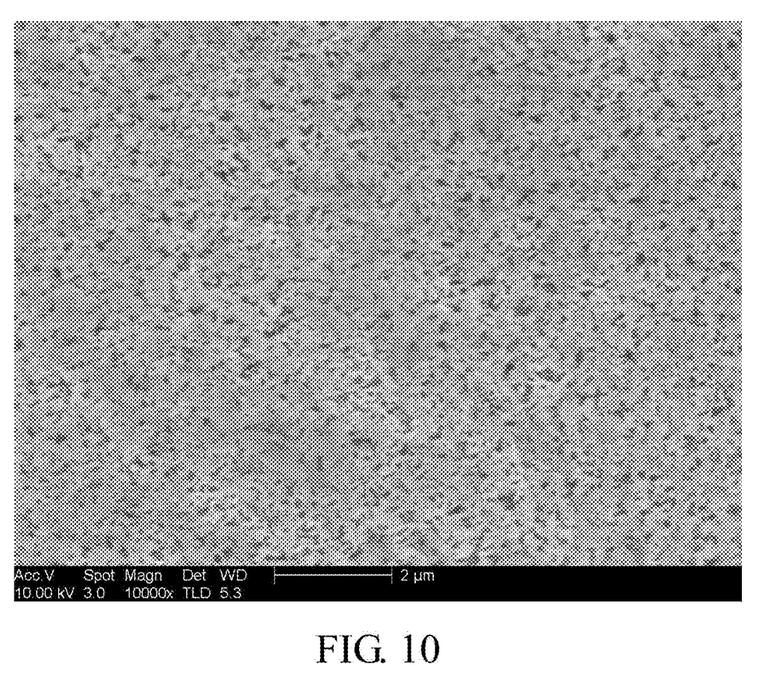
FIG. 10 shows an SEM image of a porous copper structure obtained in a comparative example 1.

Using the same method as in the example 1, metal copper and metal zinc were sequentially electroplated on the thin metal titanium plate to form the composite electroplating layer including the metal copper layer and the metal zinc layer. The difference from the example 1 is that by adjusting the time of copper plating and zinc plating, the atomic percentage of zinc in the composite electroplating layer is controlled to be greater than 60%. After that, the composite electroplated layer is cumulatively rolled, annealed, and electrochemically dealloyed using the same method as in the example 1, to obtain a porous copper structure. FIG. 10 shows an SEM image of the porous copper structure of the comparative example 1. Seen from FIG. 10, the porous copper structure has a plurality of pores with a single size.

Comparative Example 2

Figure 11:
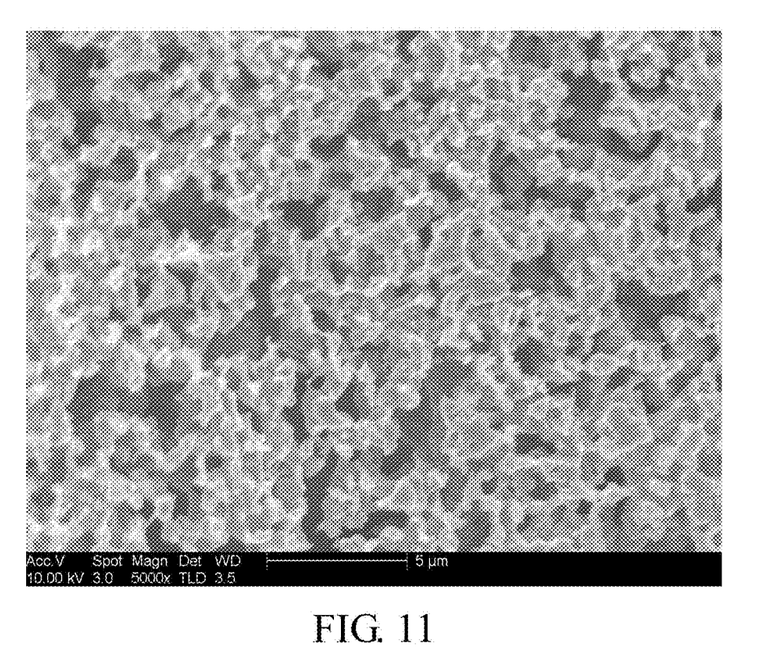
FIG. 11 shows an SEM image of a porous copper structure obtained in a comparative example 2.

Using the same method as in the example 1, metal copper and metal zinc are sequentially electroplated on the thin metal titanium plate to form the composite electroplating layer including the metal copper layer and the metal zinc layer. The difference from the example 1 is that by adjusting the time of copper plating and zinc plating, the atomic percentage of zinc in the composite electroplated layer is controlled to be less than 55%. After that, the composite electroplated layer is cumulatively rolled, annealed, and electrochemically dealloyed using the same method as in the example 1, to form a porous copper structure. FIG. 11 shows an SEM image of the porous copper structure of the comparative example 2. Seen from FIG. 11, the porous copper structure is a micron-scale porous structure with a relatively large pore size.

Referring FIGS. 4-9, the three-dimensional hierarchical layered porous copper is provided. The three-dimensional hierarchical layered porous copper includes a first surface layer, an intermediate layer, and a second surface layer stacked in that order. The first ligament constituting the first surface layer can form a plurality of micron-scale pores and a plurality of nanoscale pores. Similarly, the second ligament constituting the second surface layer can form the plurality of micron-scale pores and the plurality of nanoscale pores. The first surface layer and the second surface layer have a micro-nano hierarchical porous structure. The intermediate ligaments constituting the intermediate layer are nanoscale ligaments, the size of the nanoscale ligaments is tens of nanometers, and a plurality of nanoscale pores are formed by interlacing the intermediate ligaments.

The size of the micron-scale pores located in the first surface layer and the second surface layer is in the range from 1 micron to 3 microns, the size of the nanoscale pores located in the first surface layer and the second surface layer is tens of nanometers. The size of the nanoscale pores of the intermediate layer is several hundred nanometers.

The three-dimensional hierarchical layered porous copper has a micro-nano hierarchical porous structure on the surface layer, and the intermediate layer is a nanoscale pores structure with nanoscale ligaments. The micron-scale pores on the surface layer can provide effective channels for the mass transfer process, which facilitates the entry of ions, charges, electrons, etc. into the three-dimensional hierarchical layered porous copper, and also facilitates leaving of the ions, charges, electrons, etc. When the three-dimensional hierarchical layered porous copper is used as the current collector, the nanoscale pores of its surface layer can further increase the specific surface area of the electrode, increase the contact area between the electrode and the electrolyte, and facilitate the uniform and small current density distribution on the electrode surface, and reduce the electrochemical polarization. The nanoscale ligaments in the intermediate layer can increase the strength of the three-dimensional hierarchical layered porous copper and maintain the stability of the electrode structure during the entire cycle.

The three-dimensional hierarchical layered porous copper is stable without cracks, uniform pore distribution and uniform pore sizes. The first surface layer, the intermediate layer, and the second surface layer have a good connection between adjacent two layers. The first surface layer, the intermediate layer, and the second surface layer are not completely separated from each other. The layered structure can further increase the porosity of the three-dimensional hierarchical layered porous copper and can load more active materials in the field of energy storage.

The three-dimensional hierarchical layered porous copper has ultra-high porosity and ultra-large specific surface area, and has good application prospects in the fields of catalysis, biosensing, surface enhanced Raman scattering, and the like. Especially in the field of energy storage, the three-dimensional hierarchical layered porous copper has very good application prospects. For example, the three-dimensional hierarchical layered porous copper can inhibit the growth of lithium dendrites when the three-dimensional hierarchical layered porous copper is used in lithium anode current collectors. Used as a host material for Sn, Ge, and Si active materials, the three-dimensional hierarchical layered porous copper can alleviate the serious volume expansion of the electrode during the cycle. The composite of the three-dimensional hierarchical layered porous copper and the transition metal oxide can improve the conductivity of active materials.

The method for making the copper-zinc alloy precursor is simple in operation, low in acid consumption, low in cost, environmentally friendly, and can be electrochemically dealloyed at room temperature.

In the method for making the three-dimensional hierarchical layered porous copper, the atomic percentage of zinc in the copper-zinc alloy precursor is controlled to be 55% to 60%, so that the copper-zinc alloy precursor consists of β' phase and γ phase, thereby after the copper-zinc alloy precursor is dealloyed, a unique three-dimensional hierarchical layered porous copper can be obtained. The surface of the three-dimensional hierarchical layered porous structure is a micro-nano hierarchical porous structure, and the intermediate layer has a plurality of nanoscale ligaments and a plurality of nanoscale pores.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a three-dimensional hierarchical layered porous copper, comprising:
    stacking a copper layer and a zinc layer, to form a composite;
    folding the composite in half to form a folded composite, and rolling the folded composite;
    repeating the folding and the rolling, to form a composite structure being a solid body;
    annealing the composite structure, to form a copper-zinc alloy precursor, wherein the copper-zinc alloy precursor is a solid body, and the copper-zinc alloy precursor comprises a β' phase and γ phase; and
    treating the copper-zinc alloy precursor by electrochemical dealloying.

2. The method of claim 1, wherein when folding the composite in half to form the folded composite, the zinc layer is inside of the folded composite, and the copper layer is outside of the folded composite.

3. The method of claim 1, wherein a thickness of the folded composite is defined as 2$d$, during rolling the folded composite, the folded composite is rolled until the thickness of the folded composite becomes d.

4. The method of claim 1, wherein during annealing the composite structure, an annealing temperature is in a range from 250 degrees Celsius to 300 degrees Celsius.

5. The method of claim 1, wherein the copper-zinc alloy precursor consists of the β' phase and the γ phase, and an atomic ratio of zinc is in a range from 55% to 60%.

6. The method of claim 1, wherein treating the copper-zinc alloy precursor by electrochemical dealloying, so that zinc is removed from the copper-zinc alloy precursor.

7. The method of claim 1, wherein during electrochemical dealloying, an electrolyte is a mixed solution of hydrochloric acid and sodium chloride, and a working electrode is the copper-zinc alloy precursor.

8. The method of claim 1, wherein during electrochemical dealloying, a potential of potentiostatic polarization is in a range from −0.2V to 0.2V.

9. A method for making a three-dimensional hierarchical layered porous copper, comprising:
    stacking a copper layer and a zinc layer, to form a composite;
    folding the composite in half to form a folded composite, and rolling the folded composite;
    repeating the folding and the rolling, to form a composite structure being a solid body;
    annealing the composite structure, to form a copper-zinc alloy precursor, wherein the copper-zinc alloy precursor is a solid body, the copper-zinc alloy precursor comprises a β' phase and a γ phase, and an atomic ratio of zinc is in a range from 55% to 60%; and
    treating the copper-zinc alloy precursor by electrochemical dealloying.

10. The method of claim 9, wherein the method for making the three-dimensional hierarchical layered porous copper, consisting of:
    stacking a copper layer and a zinc layer, to form a composite;
    folding the composite in half to form a folded composite, and rolling the folded composite;
    repeating the folding and the rolling, to form a composite structure being a solid body;
    annealing the composite structure, to form a copper-zinc alloy precursor, wherein the copper-zinc alloy precursor is a solid body, the copper-zinc alloy precursor comprises a β' phase and a γ phase, and an atomic ratio of zinc is in a range from 55% to 60%;
    washing the copper-zinc alloy precursor with ultrapure water and absolute ethanol in sequence, and drying; and
    treating the copper-zinc alloy precursor by electrochemical dealloying.

11. The method of claim 1, wherein the method for making the three-dimensional hierarchical layered porous copper, consisting of:
    stacking a copper layer and a zinc layer, to form a composite;
    folding the composite in half to form a folded composite, and rolling the folded composite;
    repeating the folding and the rolling, to form a composite structure being a solid body;
    annealing the composite structure, to form a copper-zinc alloy precursor, wherein the copper-zinc alloy precursor is a solid body, the copper-zinc alloy precursor comprises a β' phase and a γ phase, and an atomic ratio of zinc is in a range from 55% to 60%;
    washing the copper-zinc alloy precursor with ultrapure water and absolute ethanol in sequence, and drying; and
    treating the copper-zinc alloy precursor by electrochemical dealloying.

* * * * *